United States Patent

Shirey et al.

[15] 3,692,195
[45] Sept. 19, 1972

[54] COOLING APPARATUS FOR BAKERY PRODUCTS

[72] Inventors: Carey L. Shirey; William H. Gilgore, both of York, Pa.

[73] Assignee: Teledyne, Inc., York, Pa.

[22] Filed: June 7, 1971

[21] Appl. No.: 150,301

[52] U.S. Cl..................214/16.4 C, 198/24, 198/30
[51] Int. Cl..............................................B65g 1/06
[58] Field of Search..............214/16.4 C; 198/24, 30

[56] References Cited

UNITED STATES PATENTS

| 2,899,040 | 8/1959 | Smith et al. | 214/16.4 C |
| 3,349,928 | 10/1967 | Howard | 214/16.4 C |

*Primary Examiner*—Gerald M. Forlenza
*Assistant Examiner*—R. B. Johnson
*Attorney*—Shoemaker and Mattare

[57] ABSTRACT

An article treating apparatus for use, for example, in cooling hot depanned loaves of bread wherein rows of hot loaves are supported on successive shelves movable by conducting means in a closed loop through a cooling zone from a loading station to an unloading station. A pair of end to end related transversely extending endless intermittently and simultaneously operated loading conveyors introduce into the loading station from opposite sides of the cooler a half shelf-width row of hot bread loaves in position to be loaded as a full shelf-width row by a common pusher from the pair of loading conveyors onto successive shelves. A pair of end to end related transversely extending endless intermittently and simultaneously operated unloading conveyors discharge from the unloading station to opposite sides of the cooler, each being arranged to receive a half of the full shelf-width row of cooled loaves pushed by a common pusher from successive shelves onto the pair of unloading conveyors. Shelf grids are fashioned to cooperate with the loaf loading and unloading means to provide guide means minimizing dislocation and jamming of loaves during transfer from the loading conveyors onto the shelves and transfer from the shelves to the unloading conveyors.

10 Claims, 14 Drawing Figures

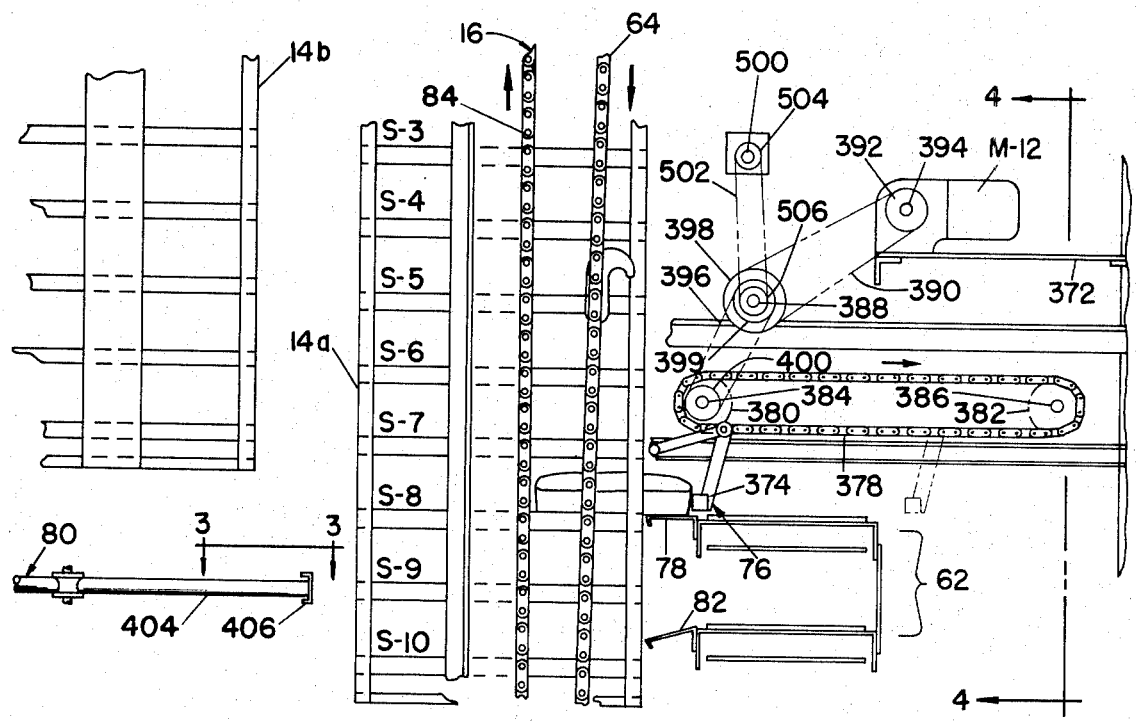
Fig 2
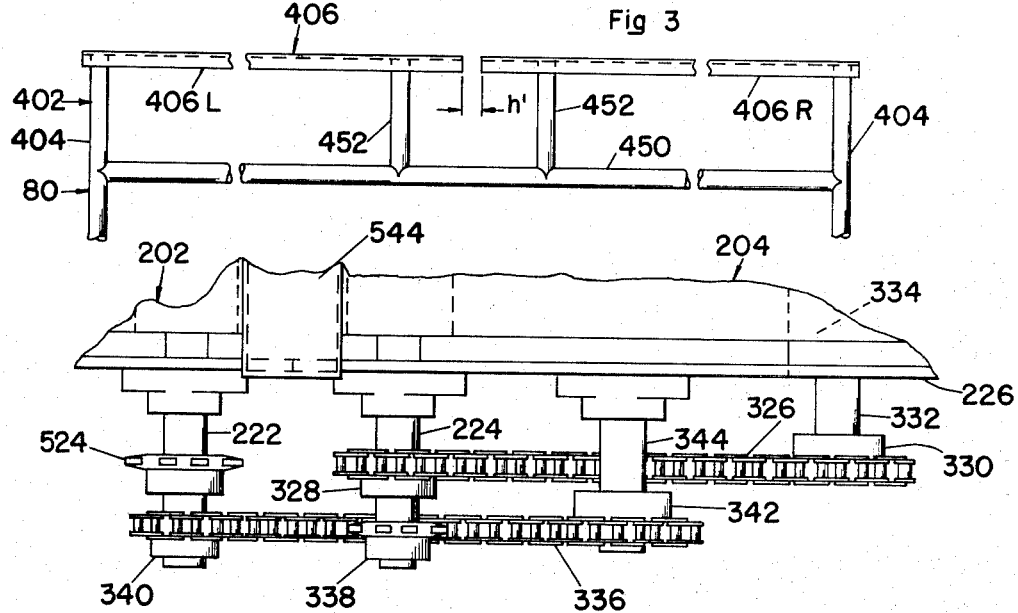
Fig 3
Fig 7
INVENTORS
CAREY L. SHIREY
WILLIAM H. GILGORE
By Shoemaker and Mattare
ATTYS.

COOLING APPARATUS FOR BAKERY PRODUCTS

BACKGROUND OF THE INVENTION

This invention relates to article treating apparatus, and more particularly to bread coolers of large capacity for use in commercial bakeries in which successive rows of hot bread loaves are charged at a loading station onto vertically spaced shelves of racks, and which racks are movable in a closed loop through the cooling chamber to an unloading station for discharging the successive rows of cooled bread loaves.

Conventionally, transversely extending intermittently operated infeed and discharge conveyor systems are arranged to introduce into the loading station from one side of the cooler successive rack shelf-width rows of hot bread loaves into position for loading onto successive rack shelves, and to discharge from the unloading station from one side of the cooler successive shelf-width rows of cooled bread loaves unloaded from successive rack shelves onto the discharge conveyor system.

With the emphasis today in modern commercial bakeries on quantity of product that can be handled in a given period of time, it has become necessary in order to meet such demands for higher production rates to increase the capacity of the bread coolers. If such increased capacity is provided by increasing the number of racks, it is necessary in such conventional coolers to increase the speed of the rack conducting means to maintain a desired minimum residence time of the product in the cooler or in other words to maintain a desired minimum cooling time; and consequently it is necessary to increase the speed of the infeed and discharge conveying systems in order to introduce in the required time a rack shelf-width row of loaves in position for loading, and discharge in the required time a rack shelf-width row of loaves that have been unloaded, each time a rack shelf passes through the loading and unloading station. Similarly, if the width of the racks is increased to take care of such greater capacity demands, it is necessary to increase the speed of the infeed and discharge conveying systems in order to introduce in the required time a full rack shelf-width row of loaves in position for loading, and discharge in the required time a full rack shelf-width row of loaves that have been unloaded, each time a rack shelf passes through the loading and unloading station.

The hot bread loaves entering the cooler are very soft and fragile and any severe handling at this stage destroys the shape of the loaves or otherwise injures them, rendering them unsalable. At excessive speeds of the infeed and discharge conveying systems, particularly because of the inertia of the loaves when the intermittently operated infeed conveying system starts and stops, control of the loaves is lost causing them to be tumbled over and collide, and frequently being jammed between stationary and moving parts of the cooler. Also at such excessive speeds of the intermittently operated infeed conveyor system, particularly upon starting and stopping, the loaves become disoriented, so that when they are loaded onto the cooler shelves or unloaded from the cooler shelves by the pushers, they collide and may be jammed against stationary parts of the cooler causing them to become bruised and damaged, and at times necessitating temporary shut downs of the cooler.

The apparatus of the present invention renders these shortcomings and disadvantages of prior art coolers negligible.

SUMMARY OF THE INVENTION

The cooler comprises a generally rectangular elongated housing defining a bread cooling chamber through which racks having vertically spaced laterally extending bread loaf supporting shelves are conducted in a closed loop, including an ascending run in the forward end of the cooler for elevating successive racks through a shelf loading and unloading station, a descending run in the rearward end, a longitudinally extending run connecting the upper ends of the ascending and descending runs, and a longitudinally extending run connecting the lower ends of the ascending and descending runs. Transversely extending vertically spaced hot bread loaf infeed conveying and cooled bread loaf discharge conveying systems extend respectively through the loading and unloading stations to introduce successive rows of hot bread loaves into position to be pushed onto successive rack shelves and to discharge successive rows of cooled bread pushed from successive rack shelves.

To provide a cooler, particularly in view of demands for coolers of larger capacity to meet higher production rates, without requiring the infeed and discharge conveying systems to be operated beyond rates of travel which are considered desirable, the infeed conveying system includes two alined end to end related transversely extending intermittently operated endless load conveyors having their upper load supporting runs running in a direction toward each other from opposite sides of the cooler. The load conveyors are disposed and arranged so that simultaneously each load conveyor brings into position a half shelf-width row of hot bread loaves to be pushed by an intermittently operated common pusher onto respective left and right rack shelf grids. The discharge conveying system includes two alined end to end related transversely extending intermittently operated endless unload conveyors having their upper load supporting runs running in a direction away from each other toward opposite sides of the cooler housing. The unload conveyors are disposed and arranged so that each unload conveyor is in position to receive a half shelf-width row of cooled bread loaves pushed by an intermittently operated common pusher from respective left and right rack shelf grids onto respective unload conveyors and are simultaneously operated for conveying a half shelf-width row of cooled bread loaves toward opposite sides of the cooler housing. The load and unload conveyors are thus capable of presenting to the shelves and removing from the shelves full shelf-width rows of bread loaves while operating at a comparatively slow speed capable of retaining complete control of the bread loaves.

The left and right rack grids are of novel construction providing at their adjacent ends guide means cooperating with guide means between the adjacent ends of the load conveyors and guide means between the adjacent ends of the unload conveyors in order to provide for transfer of the center pairs of loaves in proper orientation from respective left and right load conveyors onto respective left and right rack shelf grids and transfer of the center pairs of loaves in proper orientation from respective left and right rack shelf grids onto respective left and right unload conveyors, whereby to maintain accurate and positive control over the orientation of the loaves, to render negligible the possibility of dislocated loaves that can result in the loaves being crushed or jammed between stationary and moving parts of the cooler, at times necessitating temporary shut downs of the cooler.

BRIEF DESCRIPTION OF THE DRAWINGS

FIG. 2 is a fragmentary enlarged view of the construction of the front or right hand end of FIG. 1, showing the elements thereof in greater detail;

FIG. 3 is a plan view of the forward end portion of the unloading pusher taken on line 3—3 of FIG. 2;

FIG. 4 is an end view taken on line 4—4 of FIG. 2;

FIG. 5 is a plan view of the discharge conveyor system taken on line 5—5 of FIG. 4;

FIG. 6 is a plan view of the infeed conveyor system taken on line 6—6 of FIG. 4;

FIG. 7 is an enlarged fragmentary plan view of the drive arrangement for the adjacent ends of the loading conveyors of the infeed conveying system;

DESCRIPTION OF THE PREFERRED EMBODIMENT

Figure 1:
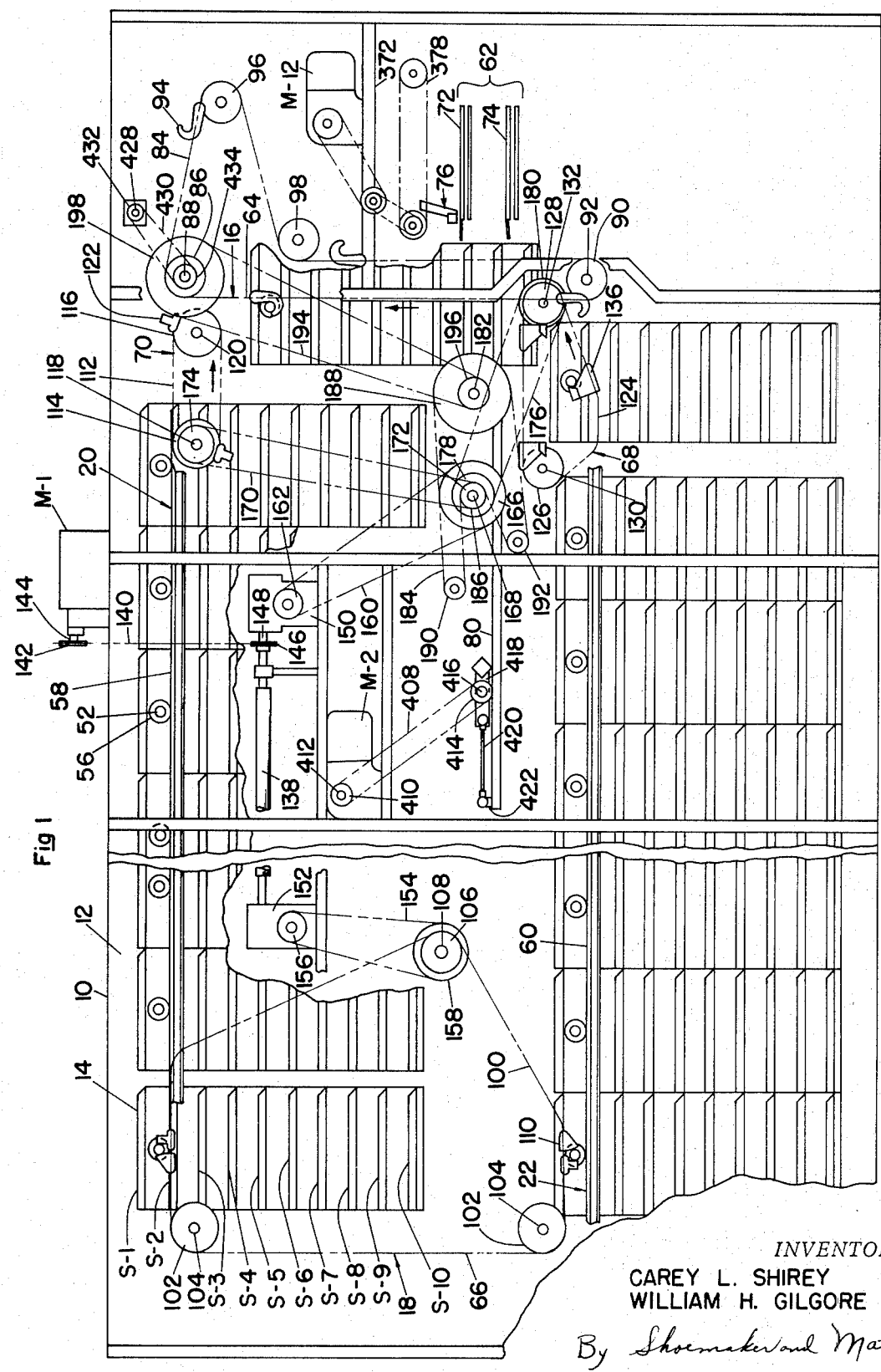
FIG. 1 is a view in side elevation taken inside the cooler housing with the various elements of the invention contained therein shown more or less diagrammatically.

The invention is shown and described as applied to a rack type bread cooler which, for purpose of illustration, may be generally similar to the construction of the rack type dough proofer shown in Howard U.S. Pat. No. 3,349,928, granted Oct. 31, 1967, and as shown in the instant assignee's co-pending application Ser. No. 67,384, filed Aug. 27, 1970. Referring particularly to FIG. 1, the cooler comprises a generally rectangular elongated housing 10 defining a cooling chamber 12 through which racks 14, carrying hot baked products such as bread loaves, travel in an elongated closed loop including an ascending run 16 near the forward end of the housing 10, a descending run 18 adjacent the rearward end of the housing 10, an upper longitudinally extending run 20 and a lower longitudinally extending run 22.

The housing 10 is preferably in the form of a skeleton framework made up of vertical and horizontal interconnected angle irons or other suitable structural elements enclosed by sheet metal panels, not shown, or other suitable enclosing means. The enclosing means is not shown in the drawings in order to better show the operating means within the housing 10. The skeleton framework includes at each side of the housing 10, outer and inner spaced frames F and F', as best shown in FIG. 4. Suitable forced air cooling means, not shown, is provided for cooling the hot baked products during their transit through the cooling chamber 12.

Figure 8:
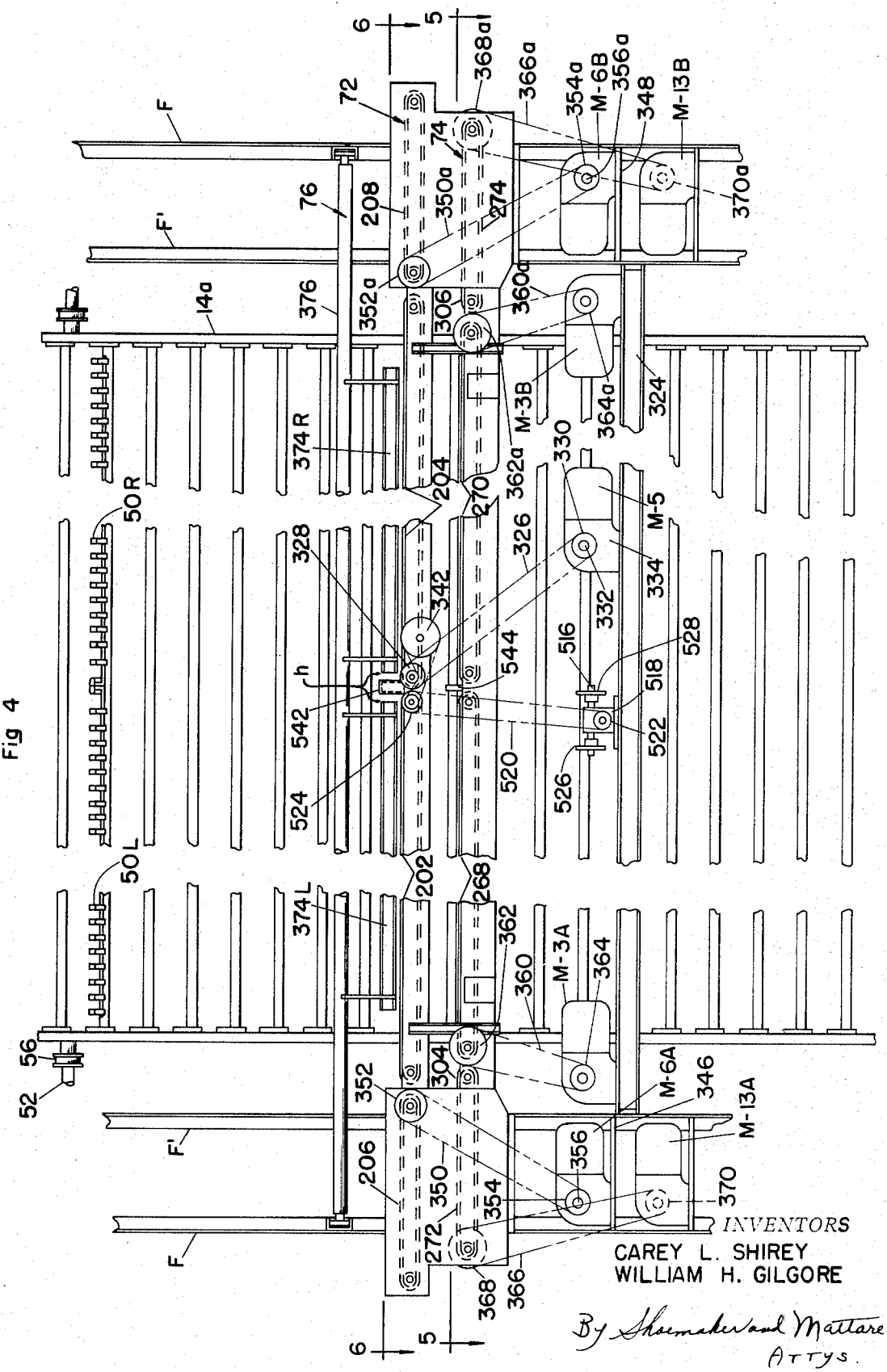
FIG. 8 is a view in perspective of a rack with parts broken away, showing the construction of the right and left rack shelf grids.

The racks 14 are rectangular in form and, referring particularly to FIG. 8, include a pair of laterally spaced, vertically extending similar end frames 24 and 26. Each of the end frames 24 and 26 includes vertical front and rear frame members 28 and 30 constituting the four vertical corner edges of the racks 14. The vertical frame members 28 and 30 are preferably in the form of angle members and are preferably made of aluminum to effect overall reduction in the weight of the racks. Completing the end frames 24 and 26 are upper and lower plate members 32 and 34 connected and rigidly secured, as by welding, to the front and rear frame members 28 and 30.

Between the end frames 24 and 26, the racks 14 are provided with a plurality of horizontal equidistantly vertically spaced shelves, ten such shelves designated S-1 through S-10, being shown in FIG. 1. Each of the shelves includes a rectangular frame 36 formed by spaced parallel transversely extending front and rear tubular frame members 38 and 40 abutting the planar surfaces of the end plate members 42 and 44, preferably formed of aluminum, and to which they are rigidly secured, as by welding. The shelf frames 36 are detachably secured to the end frames 24 and 26 by suitable means, as by cap screws 46 extending through the end plate members 42 and 44 of the shelf frames 36 and the vertical angle members 28 and 30 of the end frames 24 and 26, and nuts, not shown, threaded on the projecting ends of the cap screw 46. The shelves of the rack 14 are completed by bread supporting right and left grids 50R and 50L which span and are detachably secured to the shelf frame members 38 and 40. Only a representative number of grids are shown in the drawings, but it is understood that each shelf is provided with a right and left grid. For a purpose later to be explained, the grids 50R and 50L are of novel configuration and construction, and the particular construction of the grids will be later described in detail.

Extending laterally outward of the upper plate member 32 of each of the rack end frames 24 and 26 at opposite sides of the racks 14 is a stub shaft 52 mounted in a sleeve 54 which is welded to the plate member 32. The stub shafts 52 are disposed above the center of gravity of the racks and located centrally between the front and rear sides of the racks. Rotatably mounted on each of the stub shafts 52 inwardly of its free end is a flanged wheel 56 arranged to engage longitudinally extending upper and lower tracks 58 and 60 for pendently supporting the racks as they are rolled rearwardly along upper run 20 and forwardly along lower run 22.

The forward end portion of the cooling chamber 12 is arranged to provide a loading and unloading station 62, at which station successive transverse rows of hot bread loaves are loaded onto successive shelves of the rack 14 and successive transverse rows of cooled bread loaves are unloaded from successive rack shelves.

A continuously driven rack elevator, indicated generally by reference numeral 64, raises successive racks 14 at regular intervals through the ascending run 16 past the loading and unloading station 62 from lower run 22 to upper run 20. A continuously driven rack lowering conveyor, indicated generally by the reference numeral 66, lowers successive racks 14 at regular intervals through the descending run 18 from the upper run 20 and discharges them a distance along the lower run 22 to provide clearance for the succeeding rack that is being lowered, and in so doing all racks 14 on the lower run 22 will be pushed ahead one rack space. A continuously driven lower rack transfer 68 at the forward end of lower run 22 advances successive terminal racks of the row of racks that have been pushed ahead to a position vertically alined beneath a preceding ascending rack 14, where it is arranged to be picked up by the rack elevator 64. A continuously driven upper rack transfer 70 at the forward end of the upper run 20 picks up successive racks that have been elevated by the rack elevator 64, and discharges them along upper run 20 a distance to provide clearance for the succeeding racks that are being elevated, and in so doing all the racks 14 on the upper run 20 will be pushed ahead one rack space. The terminal rack on the upper run 20 will thus be pushed ahead into position to be picked up by the rack lowering conveyor 60.

A pair of vertically spaced horizontal endless conveyor systems extend transversely from one side of the cooler housing to the other side through the loading and unloading station 62, and are disposed an appreciable distance forward of the path of the racks that are being elevated. These conveyor systems are preferably of conventional belt type construction, the upper conveyor system being hereinafter referred to as the infeed conveyor system 72 and the lower conveyor system being hereinafter referred to as the discharge conveyor system 74.

The infeed conveyor system 72 conveys successive rack shelf-width rows of hot bread loaves into the cooler to a position in front of a rack being elevated by the rack elevator 64, where an intermittently operated pusher means, hereinafter referred to as the loading pusher 76, pushes such successive rows of bread loaves from the infeed conveyor system 72 across a transfer plate 78 onto successive rack shelves as the racks are continuously elevated through the loading and unloading station 62. The discharge conveyor system 74 conveys from the cooler successive rows of cooled bread loaves which have been pushed by an intermittently operated pusher means, hereinafter referred to as the unloading pusher 80, from successive shelves of the racks across a transfer plate 82 onto the discharge conveyor system 74.

RACK ELEVATING MEANS

The rack elevator 64, which elevates the racks 14 through the loading and unloading station 62 as previously described, includes a pair of endless chains 84 disposed in parallel vertical laterally spaced planes sufficiently far apart to freely receive a rack therebetween. Referring to FIG. 1, the chains 84 are trained at their upper ends around sprockets 86 fixed on the inner ends of transversely extending stub shafts 88, which stub shafts are rotatably mounted in suitable bearings carried by outer and inner frames F and F' of the opposite sides of the cooler housing 10. At their lower ends, the chains 84 are trained around sprockets 90 fixed on the inner ends of transversely extending stub shafts 92, which stub shafts are rotatably mounted in suitable bearings carried by outer and inner frames F and F' of the opposite sides of the cooler housing 10.

The lengths of the chains 84 are such as to carry four equidistantly spaced J-shaped hooks 94, with the distance between the J-hooks being equal to the distance between the top shelf S–1 and the bottom shelf S–10 of a rack plus one additional rack shelf space. To accommodate the length of the chains 84, they are trained around additional auxiliary forwardly offset sprockets 96 and 98, supported for rotation in suitable manner. The J-hooks 94 in their travel along the ascending run of the chains 84, as indicated by the directional arrow in FIG. 2, engaged the rack stub shafts 52 to elevate successive racks. With the described arrangement of the chains 84 and J-hooks 94, the distance between the bottom shelf of one rack and the top shelf of a succeeding rack, as the racks are elevated through the loading and unloading station 62, will be exactly one shelf space. This permits the loading pusher 76 to operate at regular equal intervals to push successive rows of bread loaves from the infeed conveyor system 72 onto successive rack shelves and permits the unloading pusher 80 to operate at regular equal intervals to push successive rows of bread loaves from successive rack shelves onto the discharge conveyor system 74, whereby to simplify the pusher operating control means.

RACK LOWERING MEANS

The rack lowering conveyor 66 is in all essential respects the same as that shown in the above referred to Howard U.S. Pat. No. 3,349,928, and includes a pair of endless chains 100 disposed in parallel laterally spaced planes sufficiently far apart to freely receive a rack 14 therebetween. The chains 100 are trained around driven sprockets 102 fixed on the inner ends of transversely extending stub shafts 104 rotatably mounted in suitable bearings carried by outer and inner frames F and F' of the opposite sides of housing 10, and around drive sprockets 106 fixed on a transversely extending through shaft 108 rotatably mounted in suitable bearings carried by the frame members F and F' of the opposite sides of housing 10. The rack lowering chains 100 are each provided with a pair of equally spaced lug and latch means 110 to engage and cradle the rack stub shafts 52 through the descending run 18 and, as previously explained, push the racks a distance along the lower run 22 before disengagement of the lug and latch means 110 from the rack stub shafts 52.

UPPER RACK TRANSFER MEANS

The upper rack transfer 70 is in all essential respects the same as that shown in the above referred to application Ser. No. 67,384, and includes a pair of endless chains 112 disposed in parallel laterally spaced planes at opposite sides of the cooler, each of the chains 112 being offset in a plane slightly laterally outward of the plane of a respective elevator chain 84. Referring to FIG. 1, the chains 112 are trained around rearward drive sprockets 114 and forward driven sprockets 116 and are driven continuously, by drive means hereinafter described, in counterclockwise direction as viewed in FIG. 1, by the same motor M-1 that drives the rack elevator 64, whereby the rack transfer 70 is operated in timed relation with the rack elevator 64.

The sprockets 114 and 116 are mounted on the inner projecting ends of transversely extending stub shafts 118 and 120, respectively, which shafts are journaled in suitable bearings carried by the outer and inner frame members F and F' at each side of the cooler housing 10. Each of the rack transfer chains 112 is provided with a pair of equidistantly spaced radially outwardly projecting lugs 122, one or the other pair of which is arranged to engage the rack stub shafts 52 of a rack that has been elevated by the elevator chains 84, thereby lifting the rack from the rack supporting J-hooks 94 of the chains 84 and moving it rearwardly along the tracks 58 of the upper run 20 as previously described.

LOWER RACK TRANSFER MEANS

The lower rack transfer 68 is in all essential respects the same as that shown in the above referred to application Ser. No. 67,384, and includes a pair of endless chains 124 disposed in parallel laterally spaced planes at opposite sides of the cooler, each of the chains 124 being offset in a plane slightly laterally outward of the plane of a respective elevator chain 84. Referring to FIG. 1, the upper runs of the chains 124 are trained over rearward driven sprockets 126 and forward drive sprockets 128, mounted respectively on the inner ends of transversely extending stub shafts 130 and 132, respectively, which shafts are journaled in suitable bearings carried by the outer and inner frames F and F' at each side of the cooler housing 10. The lower runs of the chains 124 are guided in tracks (not shown) paralleling the forward end portion of the lower rack supporting tracks 60. The chains 124 are driven continuously by drive means hereinafter described, in counter-clockwise direction as viewed in FIG. 1, by the same motor M-1 that drives the rack elevator 64, whereby the rack transfer 68 is operated in timed relation with the rack elevator 64.

The rack transfer 68 includes a plurality, in the present instance three, equidistantly spaced laterally outwardly projecting rack pushing lugs 136 carried by each of the rack transfer chains 124. One or another pair of lugs 136 is arranged to engage the stub shafts 52 of a rack and advance and raise the rack to a position in which the rack stub shafts 52 are in position to be engaged by the J-hooks of the elevator chains 84. The lugs 136 are configured and their path of movement around the forward sprockets 128 is such as to hold the racks immobilized for a sufficient length of time to permit the J-hooks of the elevator chains 84 to raise the rack from the lugs 136.

The rack elevator 64, the rack lowering means 66, the upper rack transfer 70 and the lower rack transfer 68 are continuously driven by the same motor M-1, as previously noted, and therefore operate in synchronized timed relation. The motor M-1 is mounted in any suitable location; e. g., on top of the cooler housing 10 between the forward and rearward end thereof, on the right side thereof viewed facing the front of the cooler. Motor M-1 drives a longitudinally extending torque tube 138 journaled in suitable bearings carried by cooler housing framework between outer and inner frames F and F' at the right side of the cooler. The drive means includes a chain 140 trained around a sprocket 142 on the motor output shaft 144 and a sprocket 146 on the input shaft 148 of a gear reducer 150. The gear reducer input shaft 148 is operatively connected with the forward end of the torque tube 138.

The rearward end of the torque tube 138 is operatively connected to a gear reducer 152. A chain 154 is trained around a sprocket 156 fixed on the output shaft of gear reducer 152 and a sprocket 158 fixed on the previously described transversely extending through shaft 108 for driving the rack lowering chains 100.

A chain 160 is trained around a sprocket 162 fixed on the output shaft of the gear reducer 150 and a sprocket 166 fixed on a transversely extending through shaft 168 suitably journaled in bearings carried by the outer and inner frames F and F' at each side of the cooler. A pair of chains 170 at opposite sides of the cooler are trained around sprockets 172 fixed on opposite ends of through shaft 168 and around sprockets 174 fixed on the stub shafts 118 of the previously described upper rack transfer 70 for operating the same. A pair of chains 176 at opposite ends of through shaft 168 and around sprockets 180 fixed on the stub shafts 132 of the previously described lower rack transfer 68 for operating the same.

The chains 84 of the rack elevator 64 travel in a direction opposite the chains 112 of the upper rack transfer 70 and the chains 124 of the lower rack transfer 68, as indicated by the directional arrows in FIG. 1, and to accomplish this the drive includes a supplemental transversely extending through shaft 182 suitably journaled in bearings carried by outer and inner frames F and F' at opposite sides of the cooler. A chain 184 is trained in such manner around a sprocket 186 fixed on one end of through shaft 168, a sprocket 188 fixed on one end of through shaft 182 and supplemental sprockets 190 and 192, so that shaft 182 rotates in a direction opposite the shaft 168. A pair of chains 194 at opposite sides of the cooler are trained around sprockets 196 fixed on opposite ends of through shaft 182 and around sprockets 198 fixed on the stub shafts 88 of the previously described rack elevator 64 for operating the same.

INFEED AND DISCHARGE CONVEYOR SYSTEMS

To provide coolers of considerably greater capacity without requiring the infeed and discharge conveyor systems and the conveyors leading respectively thereto and therefrom to be operated beyond rates of travel which are considered desirable, the infeed conveyor system 72 includes two axially alined end-to-end related transversely extending endless load conveyors 202 and 204 disposed within the cooler and having their upper load supporting runs running toward each other, as indicated by the directional arrows in FIG. 6. The load conveyors 202 and 204, preferably of conventional belt type construction, have their adjacent ends disposed in as close proximity as possible to the longitudinal center line of the cooler and have their remote ends disposed laterally a distance beyond the plane of the sides of the racks in the elevator. Disposed in end-to-end relation with the remote ends of the load conveyors 202 and 204 are respective metering conveyors 206 and 208 extending through opposite sides of the cooler and to which hot loaves of bread are delivered from depanning means (not shown) by conventional conveying means (not shown).

The end-to-end related load conveyors 202 and 204 include respective endless belts 214 and 216 trained at their adjacent ends over driving rollers 218 and 220 fixed on shafts 222 and 224, journaled at their opposite ends in a pair of longitudinally spaced transversely extending mounting plates 226 and 228 supported in suitable manner by the cooler framework. At their remote ends the endless belts 214 and 216 of the load conveyors 202 and 204 are trained over respective driven rollers 230 and 232 fixed on shafts 234 and 236 journaled at their opposite ends in the mounting plates 226 and 228.

The timing conveyors 206 and 208 of the infeed conveyor system 72 include respective endless belts 238 and 240 trained at their delivery ends over respective driving rollers 242 and 244 fixed respectively on shafts 246 and 248. At their receiving ends the endless belts 238 and 240 are trained over respective driven rollers 250 and 252 fixed respectively on shafts 254 and 256. The shafts 246 and 254 of the timing conveyor 206 are journaled at their opposite ends in a pair of longitudinally spaced transversely extending mounting plates 258 and 260 supported in suitable manner by the cooler framework in one side of the cooler housing. The shafts 248 and 256 of the timing conveyor 208 are journaled at their opposite ends in a pair of similar mounting plates 262 and 264 supported in suitable manner by the cooler framework in the other side of the cooler housing.

The discharge conveyor system 74 includes two axially alined end-to-end related transversely extending unload conveyors 268 and 270 disposed within the cooler and having their upper load supporting runs running away from each other, as indicated by the directional arrows in FIG. 5. The unload conveyors 268 and 270, preferably of conventional belt type construction, have their adjacent ends disposed directly beneath the adjacent ends of the load conveyors 202 and 204, in as close proximity as possible to the longitudinal center line of the cooler, and have their remote ends disposed laterally a distance beyond the plane of the sides of a rack in the elevator. Disposed in end-to-end relation with the remote ends of the unload conveyors 268 and 270 are respective discharge conveyor sections 272 and 274 extending through opposite sides of the cooler and from which loaves of cooled bread are delivered to conventional conveying means (not shown) leading to slicing and wrapping machines or to any other desired destination.

The end-to-end related unload conveyors 268 and 270 include respective endless belts 280 and 282 trained at their adjacent ends over driven rollers 284 and 286 fixed on shafts 288 and 290 journaled at their opposite ends in a pair of longitudinally spaced transversely extending mounting plates 292 and 294 supported in suitable manner by the cooler framework. At their remote ends the endless belts 280 and 282 of the unload conveyors 268 and 270 are trained over respective drive rollers 296 and 298 fixed on shafts 300 and 302 journaled at their opposite ends in the mounting plates 292 and 294.

The discharge conveyor sections 272 and 274 include endless belts 304 and 306 trained at their receiving ends over driven rollers 308 and 310 fixed respectively on shafts 312 and 314. Shaft 312 is journaled at its opposite ends in the mounting plates 258 and 260, and shaft 314 is journaled at its opposite ends in the mounting plates 262 and 264. At their delivery ends, the endless belts 304 and 306 are trained over driving rollers 316 and 318 fixed respectively or shafts 320 and 322. Shaft 320 is journaled at its opposite ends in the mounting plates 258 and 260, and shaft 322 is journaled at its opposite ends in the mounting plates 262 and 264.

INFEED AND DISCHARGE CONVEYOR SYSTEMS DRIVE MEANS

The load conveyors 202 and 204, referring to FIGS. 4, 6 and 7, are driven by a common motor M-5 mounted on a transversely extending support member 324 below the loading and unloading station 62. The drive means includes a chain 326 trained over a sprocket 328 fixed on an extension of shaft 224 and a sprocket 330 fixed on the output shaft 332 of the motor M-5 gear reducer 334. Rotation is imparted from the drive shaft 224 of the load conveyor 204 to the drive shaft 222 of the load conveyor 202 by a chain 336, trained over a sprocket 338 fixed on the extension of drive shaft 224, a sprocket 340 fixed on the extension of drive shaft 222 and an auxiliary sprocket 342 fixed on a stub shaft 344 journaled in the mounting plate 226, whereby the load conveyors 202 and 204 are driven toward each other.

The timing conveyors 206 and 208 are operated in synchronism and for convenience are operated by separate motors M-6A and M-6B mounted on support plates 346 and 348 at opposite sides of the cooler housing. The drive means for the timing conveyor 206 includes a chain 350 trained over a sprocket 352 fixed on an extension of drive shaft 246 and a sprocket 354 fixed on the output shaft 356 of gear head reduction motor M-6A. The timing conveyor 208 is driven in like manner by the gear head reduction motor M-6B and similar parts are identified by similar reference characters, followed by the suffix a.

The unload conveyors 268 and 270, referring to FIGS. 4 and 5, are operated in synchronism and for convenience are intermittently operated by separate motors M-3A and M-3B mounted on opposite ends of the support member 324. The drive means for the unload conveyor 268 includes a chain 360 trained over a sprocket 362 fixed on an extension of drive shaft 300 and a sprocket 364 fixed on the output shaft of gear head reduction motor M-3A. The unload conveyor 270 is driven in like manner by the motor M-3B and similar parts are identified by similar reference characters, followed by the suffix *a*.

The discharge conveyor sections 272 and 274 are operated in synchronism and for convenience are operated continuously by separate motors M-13A and M-13B. The drive means for the discharge conveyor section 272 includes a chain 366 trained over a sprocket 368 fixed on an extension of drive shaft 320 and a sprocket 370 fixed on the output shaft of gear head reduction motor M-13A. The discharge conveyor section 274 is driven in like manner by the motor M-13B and similar parts are identified by similar reference characters, followed by the suffix a.

LOADING PUSHER AND DRIVE MEANS THEREFOR

Referring particularly to FIGS. 1, 2 and 4, there is mounted on a bracket 372 at the forward end of the cooler, and at one side thereof, a gear head reduction motor M-12 for intermittently actuating the pusher bar 374 of the previously referred to loading pusher 76. The pusher bar 374 is pendently supported from a transversely extending tubular shaft 376 and, for a reason to be explained later, is formed by right and left sections 374R and 374L separated by a gap $h$. The shaft 376 is pivotally connected at its ends to a pair of laterally spaced longitudinally extending endless chains 378 trained at one end around drive sprockets 380 and at their other ends around driven sprockets 382 fixed on respective stub shafts 384 and 386 journaled in suitable bearings supported by frame elements at opposite sides of the cooler. The chains 378 are driven in the direction of the arrows in FIG. 2, and the drive means includes a transversely extending through shaft 388 journaled at its ends in suitable bearings supported between the outer and inner frames F and F' at opposite sides of the cooler. Rotation is imparted to the through shaft 388 by a chain 390 trained over a sprocket 392 fixed on the output shaft 394 of the motor M-12 and a sprocket 398 fixed on the through shaft 388. Completing the drive is a pair of chains 396 at opposite sides of the cooler trained around sprockets 399 fixed on opposite ends of through shaft 388 and around sprockets 400 fixed on the stub shafts 384. With the chains 378 operating in the direction of the arrows, the pusher bar 374 pushes a row of bread loaves across the surface of the load conveyors 202 and 204 and the transfer plate 78 onto a shelf of rack 14, the pusher bar 374 being shown in FIG. 2 near the end of its pushing or extending stroke. After reaching the end of its pushing stroke, the pusher bar 374 is moved on a return stroke by the chains 378 a distance over a succeeding row of bread loaves being introduced by the loading conveyors 202 and 204, to its retracted position as shown in phantom in FIG. 2.

Control means, hereinafter described, operated in timed relation with the rack elevator 64, is employed for controlling intermittent operation of the motor M-12 so that the pusher bar 374 completes a cycle of operation from its retracted position to its extended position and back to its retracted position during each elevation of a rack through one shelf space. However, the pusher bar is operated at a speed such that it completes its pushing stroke in considerably less time than is required to elevate the rack through one shelf space, e.g., the rack may be elevated through a shelf space in 8 seconds and the pusher may complete its pushing stroke in 1½ seconds, so that, for approximately the remaining 6½ seconds, the loading conveyors 202 and 204 may operate to bring in a new row of bread loaves.

UNLOADING PUSHER AND DRIVE MEANS THEREFOR

The unloading pusher 80 is generally similar to the construction shown in Howard U.S. Pat. No. 3,349,928 and, referring to FIGS. 1, 2 and 3, includes a rectangular frame 402 comprising a pair of laterally spaced, longitudinally extending tubular frame members 404 connected at their forward ends by a transversely extending pusher bar 406. Each of the longitudinal tubular frame members is supported in any suitable manner, for example as in the above referred to Howard patent, whereby the unloading pusher is freely movable in a longitudinal path. The pusher bar 406, for a reason to be explained later, is formed by right and left sections 406R and 406L separated by a gap $h$. A transversely extending support bar 450 rigidly secured at its ends to the frame members 404 rearward of the pusher bar 406 and longitudinally extending bars 452 rigidly connecting the support bar 450 and the pusher bar sections 406R and 406L provide a support for the pusher bar 406, as best shown in FIG. 3.

By means hereinafter described, reciprocating intermittent movement is imparted to the unloading pusher 80, from a retracted position as shown in FIG. 2, to an extended position and back to its retracted position. On the extending stroke of the unloading pusher 80, the pusher bar 406 sweeps successive rows of cooled loaves from successive rack shelves across transfer plate 82 onto the unload conveyors 268 and 270, as the racks 14 are continuously elevated through the loading and unloading station 62.

The unloading pusher is operated by a gear head reduction motor M-2 mounted in suitable manner between outer and inner frames F and F' at one side of the cooler housing, preferably the left side. The drive means includes a chain 408 trained over a sprocket 410 fixed on the output shaft 412 of the motor M-2 and a sprocket 414 fixed on the output shaft 412 of the motor M-2 and a sprocket 414 fixed on one end of the transversely extending through rock shaft 416. Secured on opposite ends of extensions of the through rock shaft 416 between outer and inner frames F and F' at each side of the cooler housing, are radially extending crank arms 418. Connecting rods 420 pivotally connect the free ends of the crank arms 418 with lugs 422 on the extended opposite ends of the rearward transverse member of the rectangular pusher frame 402.

Control means, hereinafter described, operated in timed relation with the rack elevator 64, is employed for controlling intermittent operation of the motor M-2 so that the crank arms 418 make one complete revolution during each elevation of a rack through one shelf space and through the above described linkage effects a cycle of operation of the pusher bar 406 from a retracted position, as shown in FIGS. 1 and 2, to an extended loaf pushing position and back to a retracted position. However, as in the case of the loading pusher bar 374, the unloading pusher bar 406 is operated at a speed such that it completes a pushing stroke in considerably less time than is required to elevate the rack through one shelf space, e.g., with the rack being elevated a shelf space in 8 seconds, the pusher may complete its pushing stroke in 1½ seconds, so that for approximately the remaining 6½ seconds the unloading conveyors 268 and 270 may operate to discharge a row of bread loaves.

CONTROL MEANS

Figure 11:
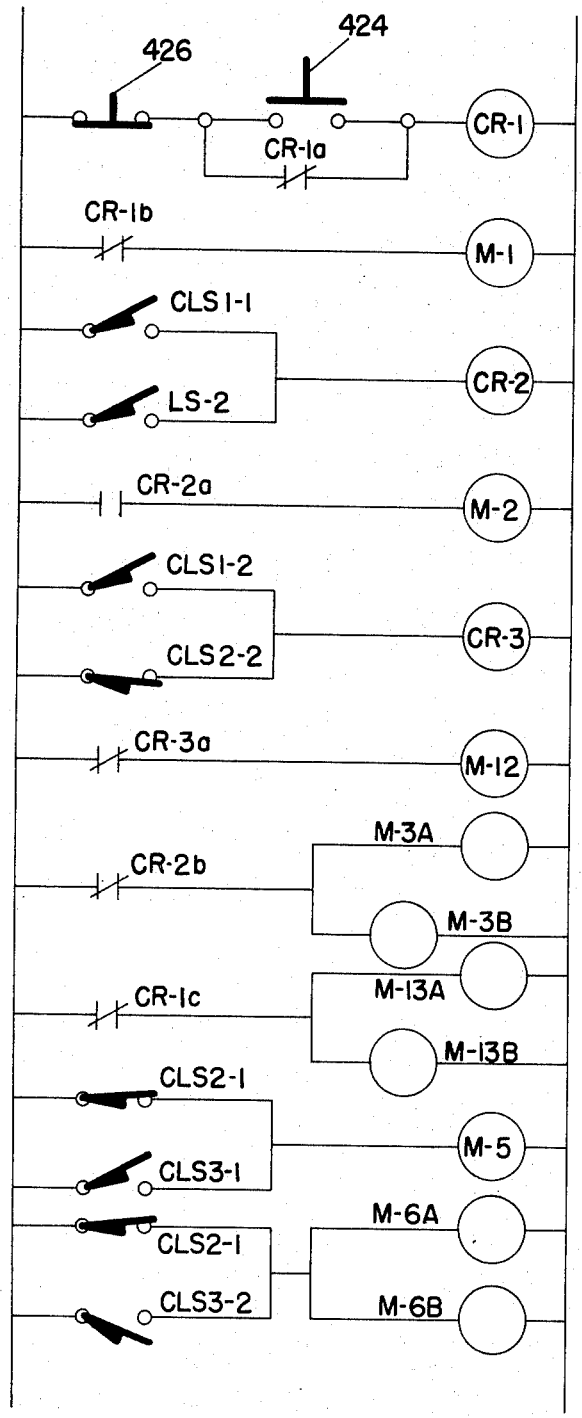
FIG. 11 is an electrical wiring diagram for operating the motors of the various elements of the cooler.

Referring to FIG. 11, schematically showing a wiring diagram of the control system for the motors M-1, M-2, M-3A and M-3B, M-12, M-5, M-6A and M-6B, and M-13A and M-13B, for operating the various elements of the cooler, with such elements in the positions as shown throughout the various figures, operation is initiated by depressing normally open start switch 424 thereby completing a circuit to and energizing control relay CR1. Energization of control relay CR1 closes its normally open contact CR1a to retain control relay CR1 energized when start switch 424 is released. Energization of control relay CR1 also closes normally open contact CR1b in circuit with motor M-1, so that the rack elevator 64, rack lowering conveyor 66, lower rack transfer 68 and upper rack transfer 70 are continuously operated until such time as normally closed stop switch 426 is depressed to break the circuit to and de-energize control relay CR1.

Figure 12:
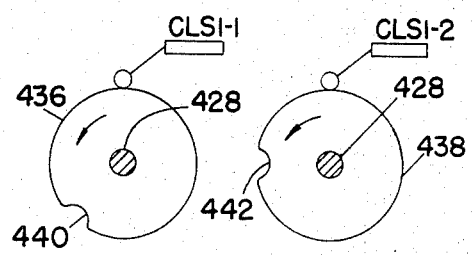
FIGS. 12, 13 and 14 are diagrammatic views of the cam control means for the loading and unloading pusher motors, and the conveyor motors of the infeed and discharge conveying systems.

Referring particularly to FIGS. 1, 11 and 12, the control means for the loading and unloading pushers 76 and 80 includes a rotatable cam shaft 428 mounted in a convenient location in the cooler housing arranged to be driven in timed relation with the rack elevator 64. The drive means includes a chain 430 trained over a sprocket 432 fixed on cam shaft 428 and over a sprocket 434 fixed on an elevator stub shaft 88, the drive ratio being such as to cause cam shaft 428 and cam discs 436 and 438 fixed on cam shaft 428 to make one revolution for each elevation of a rack through one rack shelf space.

When rack 14a has been raised by the rack elevator 64 to a position where its bottom shelf S-10 is in position to be unloaded, cam disc 436 will have rotated from its position as shown in FIG. 12, to a position in which its detent 440 is momentarily engaged by cam limit switch CLS1-1 to cause its normally closed held open contact to close, thereby completing a circuit to and energizing control relay CR2. Energization of control relay CR2 closes its normally open contact CR2a to close, thereby completing a circuit to and energizing unloading pusher motor M-2.

As soon as unloading pusher 80 starts, normally closed held open limit switch LS-2 closes to maintain control relay CR2 energized when cam limit switch CLS1-1 re-opens, thereby maintaining unloading pusher motor M-2 energized. When the unloading pusher 80 has completed its pushing and retracting cycle, which it does in a fraction of the time required to elevate the rack through a rack shelf space, as previously pointed out, limit switch LS-2 is re-opened by engagement therewith of an element of the unloading pusher 80, to de-energize control relay CR2, thereby re-opening contact CR2a and stopping the unloading pusher motor M-2.

De-energization of control relay CR2 at such time causes a normally closed contact CR2b to close thereby completing a circuit to and energizing the unload conveyor motors M-3A and M-3B. The unload conveyors 268 and 270 will now operate for the remainder of the shelf cycle time, while the unloading pusher 80 is inactivated, to deliver to the discharge conveyor sections 272 and 274 a rack shelf-width row of cooled bread loaves. When control relay CR2 is energized to start the unloading pusher 80, as above described, normally closed contact CR2b is re-opened to open the circuit to motors M-3A and M-3B to stop the unload conveyors 268 and 270.

The discharge conveyor sections 272 and 274 are, as previously described, operated continuously. Energization of control relay CR1 closes its normally open contact CR1c in circuit with motors M-13A and M-13B for operating the discharge conveyor sections 272 and 274, as shown in wiring diagram, FIG. 11.

In the position of the various elements of the cooler as shown in the drawings, the loading pusher bar 374, as previously noted, has almost completed its pushing stroke in pushing a row of bread loaves from the load conveyors 202 and 204 across the transfer plate 78 onto the shelf S-8 of rack 14a, as shown in FIG. 2. When rack 14a was raised by the rack elevator to a position where its shelf S-8 first came into position to be loaded (a minor distance below the level of the load conveyors 202 and 204), cam limit switch CLS1-2 momentarily engaged the detent 442 of cam disc 438 to complete a circuit to and energize control relay CR3. Energization of control relay CR3 closed its normally open contact CR3a completing the circuit to and initiating operation of the loading pusher motor M-12.

A rotatable cam shaft 500, referring to FIG. 2, mounted in a convenient location in the cooler housing is arranged to be driven in timed relation with the loading pusher 76. The drive means includes a chain 502 trained over a sprocket 504 fixed on cam shaft 500 and over a sprocket 506 fixed on an extension of one of the stub shafts 388, the drive ratio being such as to cause cam shaft 500 and the cam disc 508 and 510 fixed thereon to make one revolution for each cycle of operation of the loading pusher from its retracted position, as shown in phantom in FIG. 2, to its extended position and back to its retracted position, and which it completes in a fraction of the time required to elevate the rack through one rack shelf space, as previously described.

Figure 13:
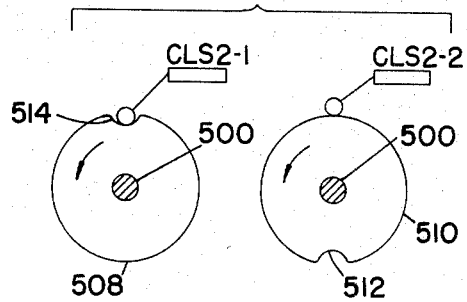

With the momentary closing of cam limit switch CLS1-2 to initiate operation of loading pusher motor M-12, as above described, cam limit switch CLS2-2 moved from engagement in detent 512 to the high portion of cam disc 510, effecting closing thereof to maintain operation of loading pusher motor M-12. When the loading pusher 76 has completed its pushing and retracting cycle from the position shown in full lines to the position shown in phantom, FIG. 2, cam disc 510 will have rotated to a position in which cam limit switch CLS2-2 engages detent 512, effecting opening thereof and de-energizing control relay CR3, FIGS. 11 and 13. De-energization of control relay CR3 opens its contact CR3a to stop the loading pusher motor M-12. The loading pusher will now remain inactive until the cam disc 438 has again rotated to a position in which cam limit switch CLS1-2 will momentarily engage detent 442.

The load conveyors 202 and 204 are preferably started as soon as the loading pusher 76 has pushed the row of bread loaves off the load conveyors, as shown in FIG. 2, since as before described, the pusher bar 374 on its retracting stroke is disposed at an elevation to clear a following row of loaves. This provides additional time during which the load conveyors may operate, so that they may be operated at a proportionately slower speed in bringing in a full shelf-width row of loaves.

Figure 14:
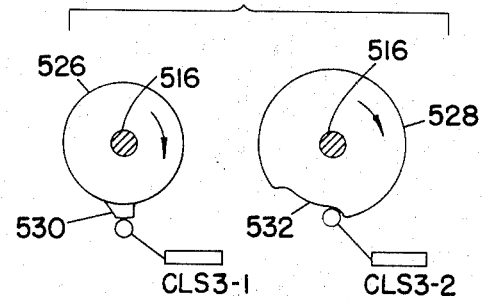

For this purpose, the cam disc 508 is arranged on the shaft 500 so that when the loading pusher 76 reaches the position shown in FIG. 2, its detent 514 is arranged to be momentarily engaged by cam limit switch CLS2–1 to close the same and complete a circuit to start load conveyor motor M–5. A rotatable cam shaft 516 of a timing unit 518 mounted in a convenient location in the forward end of the cooler housing, as shown in FIG. 4, is arranged to be driven in timed relation with the load conveyors 202 and 204. The drive means includes a chain 520 trained over a sprocket 522 of the timing unit 518 and over a sprocket 524 fixed on an extension of one of the load conveyor drive shafts, in the present instance, the drive shaft 222. The drive shaft ratio is such as to rotate the shaft 516 and the cam discs 526 and 528, FIGS. 4 and 14, fixed thereon through one revolution for a linear travel of the load conveyors 202 and 204 through a measured distance to convey the first of a row of loaves from the infeed ends of the load conveyors 202 and 204 to the positions occupied by the loaves marked x, i.e., at the extreme adjacent ends of the load conveyors 202 and 204, as shown in FIG. 6, thereby assuring disposition of a full rack shelf-width row of loaves in front of the loading pusher 76.

Upon initiation of operation of the load conveyors 202 and 204, as above described, cam limit switch CLS3–1 drops off the node 530 of cam 526, to close the same to maintain a circuit to load conveyor motor M–5 when momentarily closed cam limit switch CLS2–1 re-opens. When the load conveyors 202 and 204 have completed their measured linear travel, cam limit switch CLS3–1 will again be engaged by the node 530 to open the same, thereby breaking the circuit to the load conveyor motor M–5.

It is important that the individual loaves of the successive rows collected on the load conveyors 202 and 204 be sufficiently spaced in order to expose the sides of the loaves for proper cooling and conditioning in their travel through the cooling chamber 12 and yet provide for a maximum number of loaves in the rows. This objective is obtained by operating the load conveyors 202 and 204 at a slightly greater speed than the metering conveyors 206 and 208 to provide a uniform spacing, preferably about one-half inch, between the loaves. During the interval that operation of the load conveyors and metering conveyors is interrupted, a number of loaves being conveyed from the depanner (not shown) will accumulate in a consolidated row adjacent the metering conveyors 206 and 208.

Operation of the load conveyors 202 and 204 and metering conveyors 206 and 208 starts simultaneously since closing of cam limit switch CLS2–1 completing the circuit to motor M–5 for initiating operation of the load conveyors 202 and 204, as previously described, also completes a circuit to motors M–6A and M–6B to initiate operation of the metering conveyors 206 and 208. Upon initiation of operation of the metering conveyors 206 and 208, cam limit switch CLS3–2 is moved out of the detent 532 to close the same and maintain the circuit to metering conveyor motors M–6A and M–6B when momentarily closed cam limit switch CLS2–1 re-opens.

It is important, however, that the metering conveyors 206 and 208 stop sufficiently in advance of the load conveyors 202 and 204 so that the last loaf of a row of bread loaves released by each of the metering conveyors 206 and 208 will be conveyed by the load conveyors 202 and 204 to a position wholly in front of a rack shelf when the load conveyors 202 and 204 stop, to thereby prevent a loaf or loaves from being jammed between the end of the loading pushers and the inner framework of the cooler housing or the side of a rack on the pushing stroke of the loading pushers. This is accomplished by making the detent 532 of cam disc 528 of sufficient circumferential extent to cause the cam limit switch CLS3–2 to drop into the detent 532 sufficiently before cam limit switch CLS3–1 engages the node 530 of cam disc 526 to stop the metering conveyors 206 and 108 a desired time in advance of the load conveyors 202 and 204.

A transfer plate 534 supported between the mounting plates 258 and 260 bridging the V-shaped gap between the adjacent ends of the metering conveyor belt 238 and the load conveyor belt 214, and a similar transfer plate 536 supported between the mounting plates 262 and 264 bridging the V-shaped gap between the adjacent ends of the metering conveyor belt 240 and the load conveyor belt 216, facilitates the smooth transfer of the loaves from the metering conveyors to the load conveyors and precludes trapping of loaves in the gaps and disorientation of the loaves. Similarly, support plates 538 and 540 supported between mounting plates 292 and 294 adjacent the gaps between unload conveyor belt 280 and discharge conveyor belt 304, and between unload conveyor belt 282 and discharge conveyor belt 306 facilitate transfer of the loaves of cooled bread therebetween.

A longitudinally extending divider bar 542 substantially bridges the gap between the load conveyors 202 and 204 and extends across the surface of the transfer plate 78, as best shown in FIGS. 4 and 6. The divider bar 542 is secured at its forward end to the mounting plate 226 and at its rearward end to the rearward edge of the transfer plate 78 in any suitable manner. The divider bar 542 is of sufficient height to act as a barrier to stop the leading loaves of bread should they fail to stop accurately at the end of the previously described measured travel of the load conveyors 202 and 204 in the positions shown occupied by the loaves marked X in FIG. 6. The divider bar 542, which is approximately 2⅝ inches in width, serves another and more important purpose that will be adverted to later.

A longitudinally extending divider bar 544 partially bridges the gap between the unload conveyors 268 and 270 and extends across the surface of the transfer plate 82, as best shown in FIGS. 4 and 5. The divider bar 544 is secured at its forward end to the mounting plate 292 and at its rearward end to the rearward end of the transfer plate 82 in any suitable manner. The divider bar 540 forms a guide for the adjacent center pair of loaves being pushed from successive rack shelves onto the unload conveyors 268 and 270 as will be later described.

The front and rear shelf frame members 28 and 40 of the previously described racks 14 are connected by a plurality of laterally spaced longitudinally extending support plates 546, with the opposite ends of the plates 546 being welded to the upper ends of the confronting sides of the shelf frame members 38 and 40. The support plates 546 maintain the desired spacing between the front and rear frame members 38 and 40 and provide means for anchoring the grids 50R and 50L, facilitating proper locating of the grids 50R and 50L and preventing lateral displacement thereof relative to the shelf frames 36.

The grids 50R and 50L are formed by a plurality of closely spaced rods 548 having longitudinally extending sections 550 spanning the front and rear frame members 38 and 40 to form a horizontal bread loaf supporting floor 552. At their rearward ends each of the rods 548 has an upturned inverted U-shaped section 554, collectively forming a rear wall 556 to provide a stop for the loaves of bread against accidental undesirable rearward displacement thereof. Bent front and rear terminal portions 558 and 560 of the rods 548 are arranged to extend partially down the front wall and down and under the rear and bottom walls, respectively, of the front and rear frame members 38 and 40. The grids 50R and 50L are provided with a plurality of spaced transversely extending rods 562 spot welded at the intersections with the rods 548 to form integrated units.

The grids 50R and 50L are each provided at their adjacent ends with an additional horizontal longitudinally extending rod 564, disposed at an elevation above the plane of the rods 548, a half inch for example or somewhat higher. The rods 564, except for their terminal forward end portions 566 are spaced from the rods 548 substantially the same distance as between the rods 548 themselves, preferably about three eights of an inch, and are spaced from each other a distance preferably somewhat less than the width of the divider bar 542. As the adjacent center pairs of loaves are pushed from the load conveyors 202 and 204, across the transfer plate 78 and onto the grids 50R and 50L, the divider bar 542 and the elevated rods 564 guide and maintain the loaves on their respective sides of the rack shelves, so that they are in proper position when ready to be unloaded to be pushed from the rack shelves onto their respective unload conveyors 268 and 270, precluding any possibility of a jam or pile up of the loaves during such transfer of the loaves. As previously pointed out, the loading pusher bar 374 is formed by right and left sections 374R and 374L separated by a gap h, so that the gap h permits the sections 374R and 374L of the pusher bar 374 as it traverses the load conveyors 202 and 204 and the transfer plate 78, to pass along opposite sides of divider bar 542.

Figure 9:
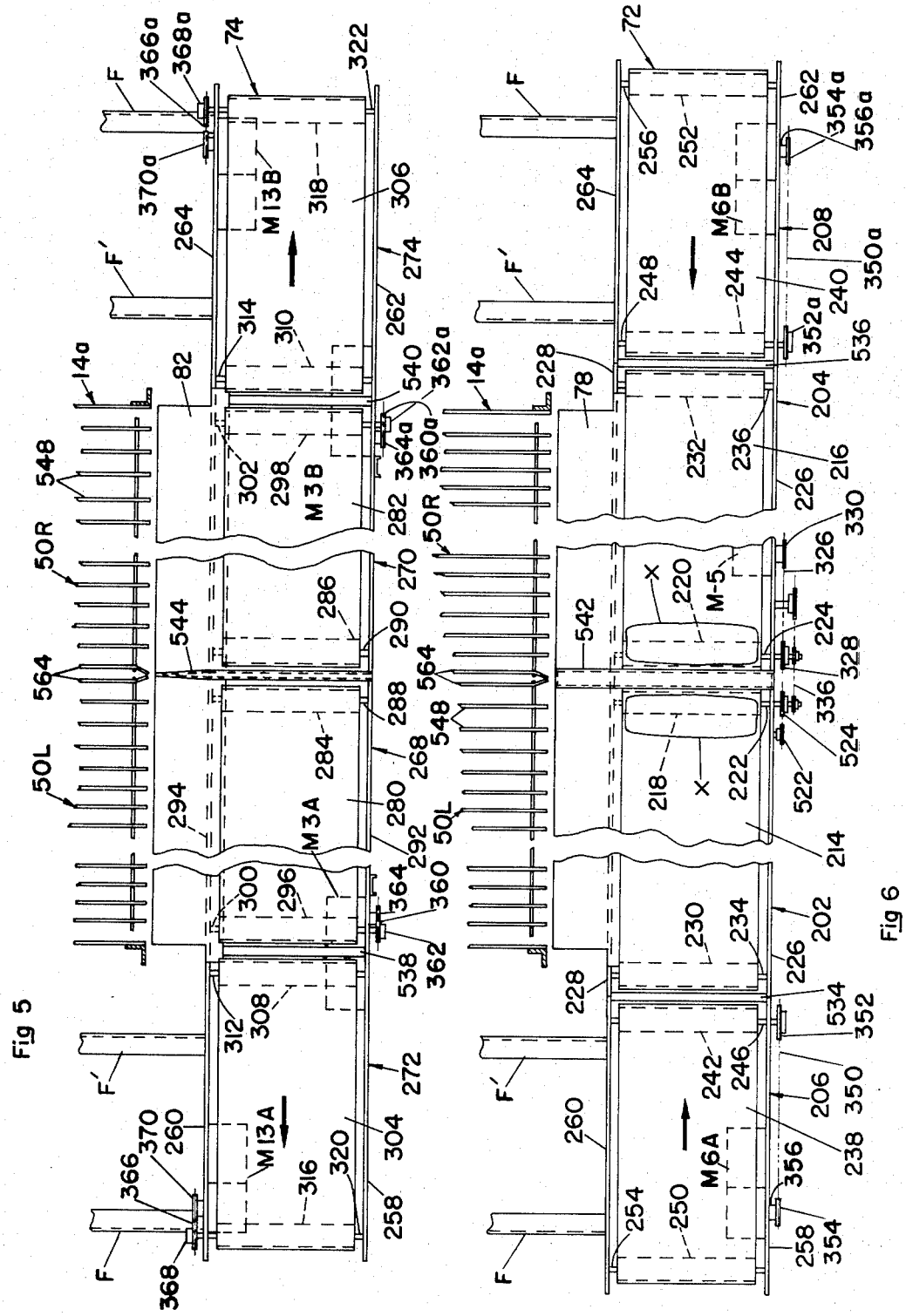
FIG. 9 is an enlarged fragmentary plan view of the adjacent front end portions of the right and left rack shelf grids.
Figure 10:
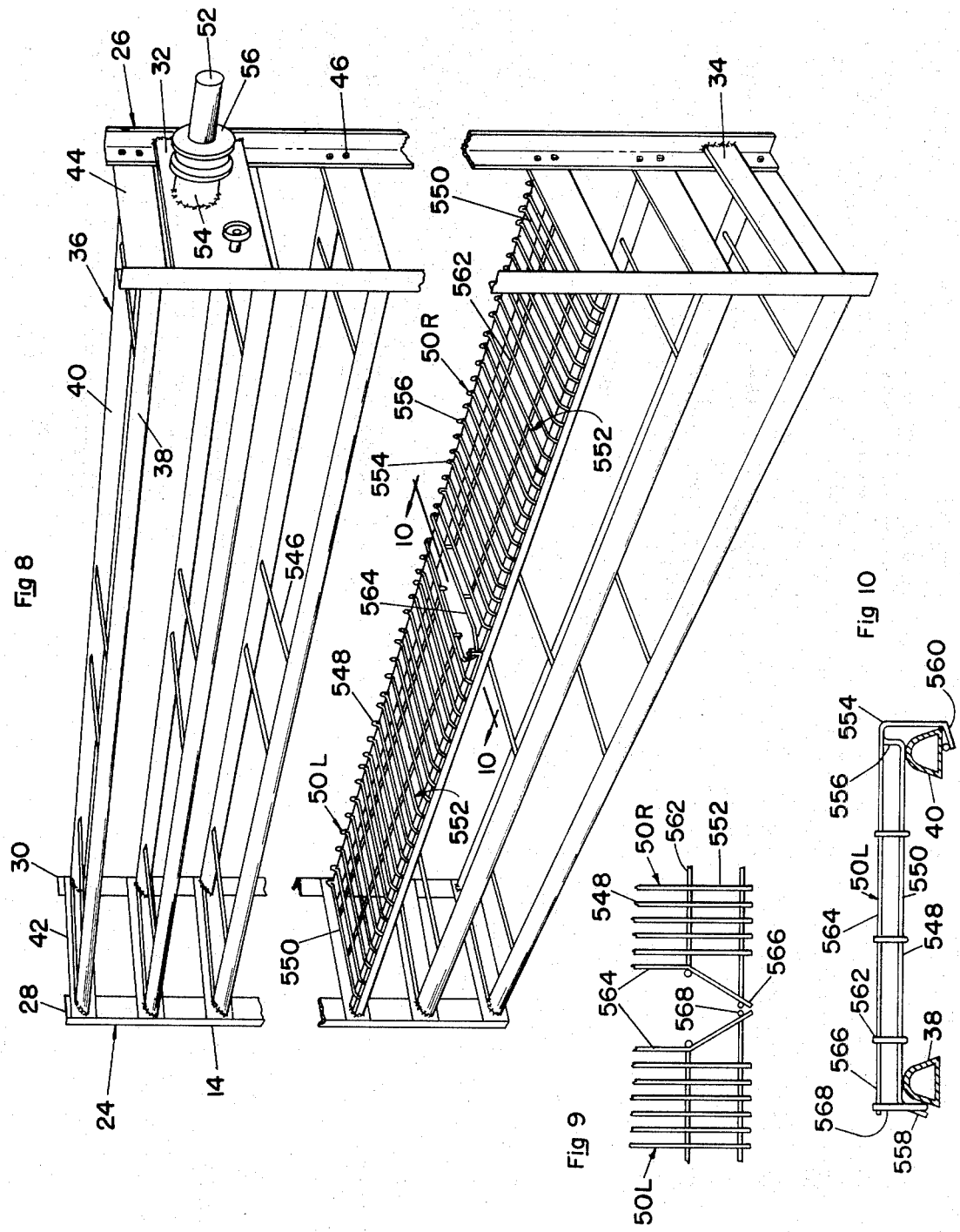
FIG. 10 is a sectional view taken on line 10—10 of FIG. 8.

In order to insure that the adjacent center loaves of bread as they are pushed onto the grids 50R and 50L will not be impaled or caught by the forward ends of the rods 564, their terminal forward end portions 566 are bent to converge, as best shown in FIGS. 6 and 9. The rods 564 are retained in their elevated positions by being spot welded to upwardly bent extensions 568 of the transversely extending rods 562.

The rearward end portion of the divider bar 544 that extends across the transfer plate 82 is preferably formed to converge in its rearward extent, as best shown in FIG. 5, to insure against the adjacent center loaves as they are pushed from the grids 50R and 50L from butting against the free edges of the divider bar 544 and to provide in cooperation with the forward portion of the divider bar 544 a guide for directing the center loaf on grid 50R onto unload conveyor 204 and the center loaf on grid 50L onto unload conveyor 202.

With each of the load conveyors 202 and 204 having to load only one half the width of each rack shelf, and each of the unload conveyors having to unload only one half the width of each rack shelf, the load and unload conveyors need operate only approximately at one half the speed that a single load conveyor and a single unload conveyor must operate to load and unload a full shelf-width row of bread loaves. It also follows that the various conveyors leading to and from the load and unload conveyors may be operated at greatly reduced speeds. Thus the capacity of the cooler can be greatly increased without increasing the speed of the bread loaf feeding and discharging conveyor systems to the point where loss of control of the bread loaves occurs, thereby minimizing the possibility of disorienting or overturning the bread loaves, particularly when starting or stopping the various conveyors.

The novel rack grid construction cooperates with the rack loading and unloading means to maintain the bread loaves during such transfer in desired orientation so that they are delivered to and discharged from the rack shelves in a manner to avoid jamming or piling up of loaves against elements of the cooler with consequent damage to the loaves and eliminating the possibility of costly shut downs of the cooler during runs of the products.

The invention has been described with particular reference to its use as a bread cooler. However, it is readily apparent that with slight changes, the invention is capable of use as a dough proofer, or for treatment of other products in a treating chamber.

We claim:

1. In article processing apparatus:
a plurality of transversely extending shelves for supporting on each a transversely extending row of articles to be treated;
means for conducting a succession of shelves in a closed loop including an upright run portion at one end of said loop;
a housing enclosing said shelf conducting means;
a conveyor line extending transversely through said housing from one side to the other and disposed in front of the path of said shelves along said upright run portion;
said conveyor line including a pair of end to end related load conveyors terminating at their adjacent ends intermediate the ends of said shelves;
means for operating said load conveyors in a direction toward each other;
common pusher means associated with said load conveyors; and
means for intermittently operating said pusher means through an extending and retracting stroke for sweeping articles on said extending stroke from said load conveyors onto successive shelves.

2. Article processing apparatus in accordance with claim 1, wherein:
said load conveyors together extend at least the full length of said shelves, and which apparatus includes;
control means for said load conveyor operating means operated in timed relation with said shelf conducting means for intermittently operating said load conveyors in unison through a measured travel such that each of said load conveyors is adapted to bring a half shelf-width row of articles in front of each of said shelves.

3. In article processing apparatus:

a plurality of transversely extending shelves for supporting on each a transversely extending row of articles to be treated;

means for conducting a succession of shelves in a closed loop including an upright run portion at one end of said loop;

a housing enclosing said shelf conducting means;

upper and lower vertically spaced conveyor lines extending transversely through said housing from one side to the other disposed in front of the path of said shelves along said upright run portion;

one of said conveyor lines including a pair of end to end related load conveyors;

means for operating said load conveyors in a direction toward each other;

said load conveyors having their adjacent ends terminating midway of the ends of a shelf;

said other conveyor line including a pair of end to end related unload conveyors;

means for operating said unload conveyors in a direction away from each other;

said unload conveyors having their adjacent ends terminating midway of the ends of a shelf;

pusher means associated with each of said conveyor lines; and means for intermittently operating each of said pusher means through an extending and retracting stroke for sweeping articles on said extending stroke of one pusher from said load conveyors onto successive shelves, and on the extending stroke of the other of said pusher means from successive shelves onto said unload conveyors.

4. In article processing apparatus:

a plurality of transversely extending shelves for supporting on each a transversely extending row of articles to be treated;

means for conducting a succession of shelves in a closed loop including an upright run portion at one end of said loop through which said shelves are conducted in equidistantly vertically spaced relation;

a longitudinally elongated housing enclosing said shelf conducting means;

upper and lower vertically spaced conveyor lines extending transversely through said housing from one side to the other disposed in front of the path of said shelves along said upright run portion;

one of said conveyor lines including a pair of end to end related load conveyors terminating at their adjacent ends midway of the ends of a shelf;

actuating means for operating said load conveyors in a direction toward each other for respectively conveying a row of articles in front of the left and right halves respectively of said shelves;

first pusher means for pushing a row of articles from one of said load conveyors onto the left half and from the other of said load conveyors onto the right half of a shelf;

the other of said conveyor lines including a pair of end to end related unload conveyors terminating at their adjacent ends midway of the ends of a shelf;

second pusher means for pushing a row of articles from the left half of a shelf onto one of said unload conveyors and from the right half of a shelf onto the other of said unload conveyors; and actuating means for operating said unload conveyors in a direction away from each other for conveying the rows of articles thereon toward opposite sides of said housing.

5. In a bread cooler:

a plurality of racks having vertically spaced shelves for supporting on each a transversely extending row of bread loaves;

means for conducting a succession of racks in a closed loop including an upright run portion at one end of said loop;

a longitudinally elongated housing enclosing said rack conducting means;

a pair of vertically spaced apart conveyor lines extending transversely through said housing from one side to the other thereof and disposed in front of the path of said racks as they travel along said upright run portion;

one of said conveyor lines including a pair of end to end related load conveyors;

actuating means for operating said load conveyors in a direction toward each other;

control means for said actuating means operated in timed relation with said conducting means for intermittently operating said load conveyors through a measured travel such that each of said load conveyors brings a half shelf-width row of bread loaves in front of each of said rack shelves;

pusher means for pushing a half shelf-width row of loaves from each of said load conveyors onto each of said rack shelves;

the other of said conveyor lines including a pair of end to end related unload conveyors;

pusher means for pushing said half shelf-width rows of loaves from each of said rack shelves onto respective ones of said unload conveyors; and actuating means for operating said unload conveyors in a direction away from each other for conveying said half shelf-width rows of loaves toward opposite sides of said housing.

6. In article processing apparatus:

a plurality of transversely extending shelves for supporting on each a transversely extending row of articles to be treated;

means for conducting a succession of shelves in a closed loop including an upright run portion at one end of said loop;

a housing enclosing said shelf conducting means;

upper and lower vertically spaced conveyor lines extending transversely through said housing from one side to the other disposed in front of the path of said shelves along said upright run portion;

one of said conveyor lines including a pair of end to end related load conveyors terminating at their adjacent ends midway of the ends of a shelf;

actuating means for operating said load conveyors in a direction toward each other for respectively conveying a half shelf-width row of articles in front of the left and right halves respectively of said shelves;

pusher means and a cooperating guide member extending crosswise of said load conveyors at their adjacent ends for pushing said rows of articles and guiding the adjacent end articles of said rows, from respective load conveyors onto respective left and right halves of said shelves;

the other of said conveyor lines including a pair of end to end related unload conveyors terminating at their adjacent ends midway of the ends of a shelf;

pusher means for pushing said half shelf-width row of articles from said left and right halves of said shelves onto respective unload conveyors; and actuating means for operating said unload conveyors in a direction away from each other for conveying said half shelf-width rows of articles thereon toward opposite sides of the housing.

7. Article processing apparatus in accordance with Claim 6, wherein said shelves are in the form of grids including a plurality of longitudinally extending, laterally spaced rods forming a support for said articles, the adjacent center pair of rods being disposed at an elevation above the plane of said article supporting rods;

the rearward portion of said center pair of rods being spaced apart a distance equal at least to the width of said guide member and the forward portion of said center pair of rods converging to bring their forward ends substantially closer together than the width of said guide member;

said elevated rods constituting an extension of said guide member for guiding the adjacent end articles of said half shelf-width rows of articles from said load conveyors to said shelves.

8. In article process apparatus:

a plurality of transversely extending shelves for supporting on each a transversely extending row of articles to be treated;

means for conducting a succession of shelves in a closed loop including an upright run portion at one end of said loop;

a housing enclosing said shelf conducting means;

upper and lower vertically spaced conveyor lines extending transversely through said housing from one side to the other disposed in front of the path of said shelves along said upright run portion;

one of said conveyor lines including a pair of end to end related load conveyors terminating at their adjacent ends midway of the ends of a shelf;

actuating means for operating said load conveyors in a direction toward each other for respectively conveying a row of articles in front of the left and right halves respectively of said shelves;

pusher means and a cooperating guide member extending crosswise of said load conveyors at their adjacent ends for pushing said rows of articles and guiding the adjacent end articles of said rows from respective load conveyors onto respective left and right halves of said shelves;

the other of said conveyor lines including a pair of end to end related unload conveyors terminating at their adjacent ends midway of the ends of a shelf;

pusher means and a cooperating guide member extending crosswise of said unload conveyors at their adjacent ends for pushing said rows of articles and guiding the adjacent end articles of said rows from respective left and right halves of said shelves onto respective unload conveyors; and actuating means for operating said unload conveyors in a direction away from each other for conveying the rows of articles thereon toward opposite sides of the housing.

9. Article processing apparatus in accordance with claim 8, wherein said shelves are in the form of grids including a plurality of longitudinally extending, laterally spaced rods forming a support for said articles, the adjacent center pair of said rods being disposed at an elevation above the plane of said article supporting rods;

said elevated rods constituting an extension of said guide members for guiding the adjacent end articles of said rows of articles to and from said shelves.

10. Article processing apparatus in accordance with claim 8, wherein said pusher members are centrally recessed to provide clearance for their associated guide members.

* * * * *